Feb. 8, 1955  A. V. RAUGHT  2,701,665
FERTILIZER DISTRIBUTOR
Filed April 28, 1952  3 Sheets-Sheet 1
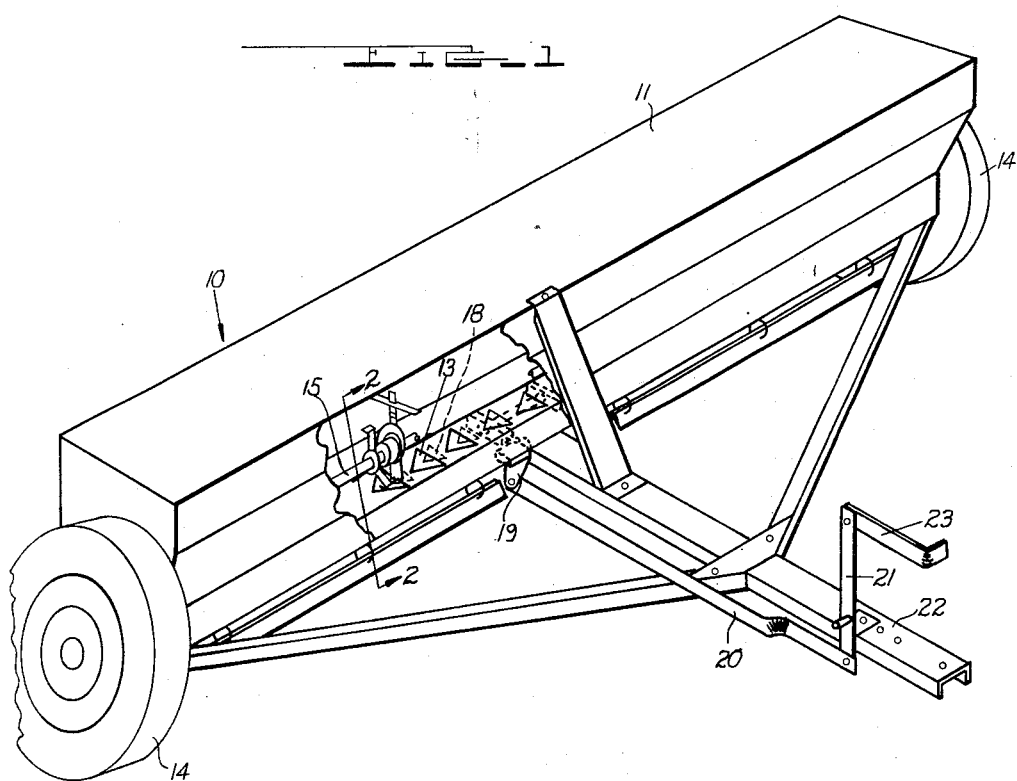
INVENTOR.
ARTHUR V. RAUGHT
BY
AND
ATTORNEYS

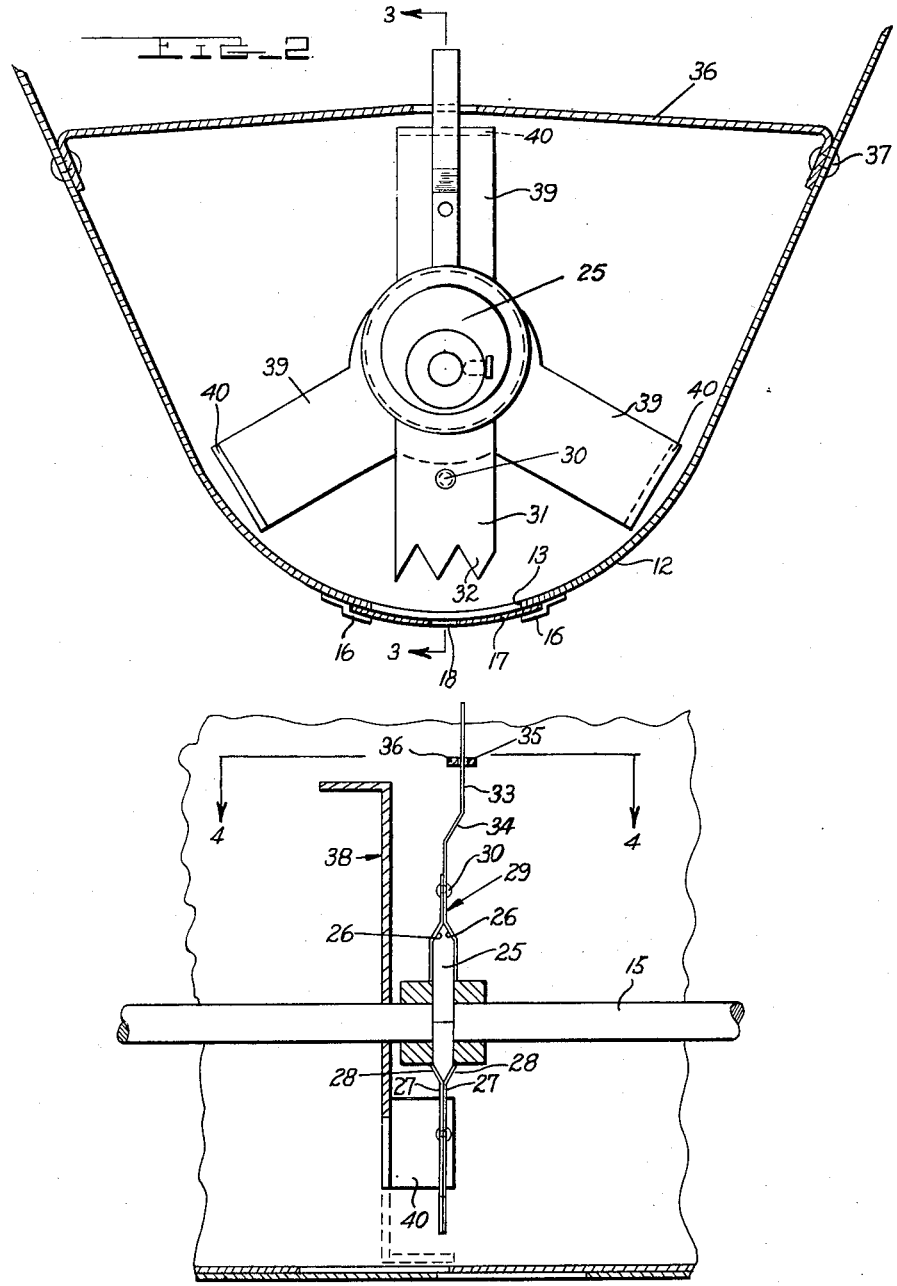

Feb. 8, 1955  A. V. RAUGHT  2,701,665
FERTILIZER DISTRIBUTOR
Filed April 28, 1952  3 Sheets-Sheet 3
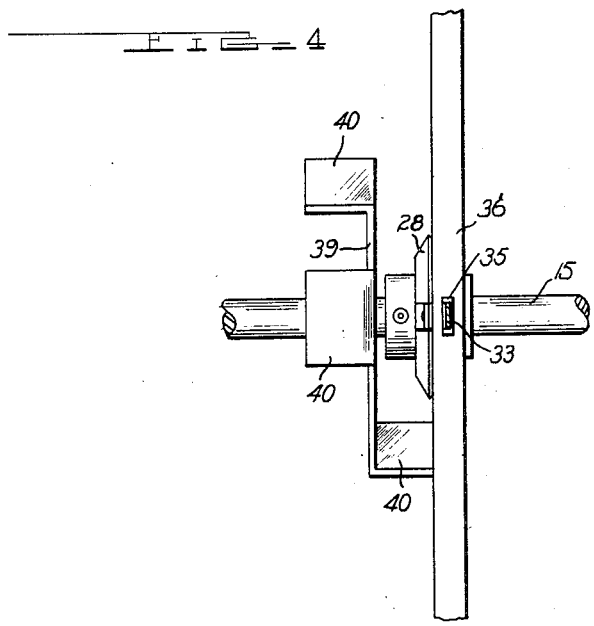
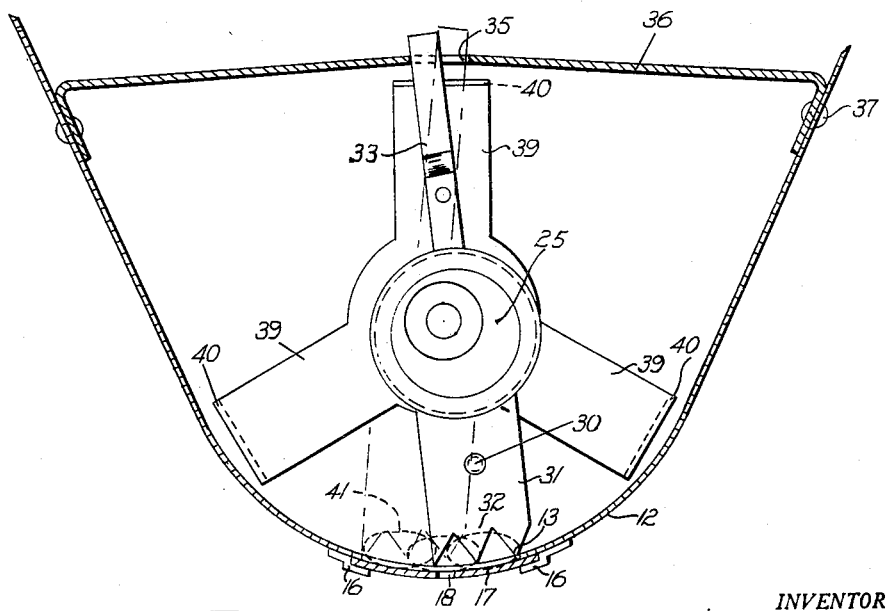
INVENTOR.
ARTHUR V. RAUGHT
BY
AND
ATTORNEYS

United States Patent Office 2,701,665
Patented Feb. 8, 1955

2,701,665

FERTILIZER DISTRIBUTOR

Arthur V. Raught, Birmingham, Mich., assignor, by mesne assignments, to Ford Motor Company, Dearborn, Mich., a corporation of Delaware Application April 28, 1952, Serial No. 284,693

3 Claims. (Cl. 222—177)

The present invention relates to a material spreader and more particularly to a distributor wherein fertilizer or similar material is forceably ejected through a plurality of superimposed registerable apertures.

In the dispensing of commercial artificial fertilizer, considerable attention has been devoted to the accurate metering and uniform gravity distribution of fertilizer from a relatively large portable hopper. The difficulty of accurately feeding fertilizer from such a hopper through small dispensing orifices is well appreciated in the art, particularly since the fertilizer tends to "cake" or agglomerate when subjected to conditions of high humidity, moisture, or prolonged storage. Not only is it necessary to dispense agglomerated fertilizer through the orifices, but it is essential that bridging of the fertilizer within the hopper be prevented to insure even gravity flow of the fertilizer. Also, difficulty is encountered, particularly during the dispensing of fertilizer at a relatively slow rate, by the stratification and blocking of the fertilizer at the relatively small dispensing orifices.

The present invention provides an improved fertilizer distributor which continuously agitates the fertilizer within the distributor, particularly in the vicinity of the dispensing openings, and which forceably ejects the fertilizer through the dispensing orifices. More particularly, the present invention contemplates the utilization of an elongated drive shaft extending longitudinally through a distributor hopper and overlying the dispensing apertures formed in the hopper bottom. The rotatable shaft carries radially extending agitator spiders which revolve within the hopper to prevent agglomeration and bridging of the fertilizer. The shaft also carries rotatable cam means aligned with each of the dispensing openings, the cam means serving to actuate an ejector forceably enterable into and movable through a portion of the dispensing openings. The ejectors are provided with terminal teeth which actually enter the dispensing orifices and which travel therethrough in an elliptical or similarly arcuate path so that the fertilizer in the opening is subjected to a combined wiping and dispensing action. Further, the ejector is actuatable in timed relation with respect to the agitating spiders so that a portion of the spider is interposed between the ejector and the dispensing aperture when the ejector is in a position remote from the aperture. Thus, the agitator tends to clear the dispensing opening of relatively large lumps of fertilizer, so that effective functioning of the ejector to force fertilizer through the orifices is facilitated.

It is, therefore, an important object of the present invention to provide an improved fertilizer distributor provided with a combined fertilizer agitating and ejecting means.

Another important object is the provision of a fertilizer distributor provided with a cam-actuated means for forceably ejecting fertilizer through a dispensing orifice.

It is a further important object of the present invention to provide an improved fertilizer distributor wherein fertilizer is dispensed through an aperture through the combined action of agitating means and ejector means operable in timed relation to clear the aperture of obstructions and forceably eject fertilizer therethrough.

Still another important object is the provision of a fertilizer distributor having an ejector movable in an arcuate path to subject fertilizer at a dispensing orifice to a combined wiping and ejecting action.

Yet a further object is to provide a fertilizer distributor wherein an ejector is actuated for movement in an elliptical path to forceably dispense fertilizer through an aperture interposed in the path of travel of the ejector, the ejector being operable in timed relation with an agitator which is effective to wipe the aperture of lumps and the like prior to the ejection of fertilizer therethrough.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a perspective view of a fertilizer distributor of the present invention with parts broken away to expose the distributor agitating and ejecting mechanism;

Figure 2 is a sectional view, with parts shown in elevation, taken along the plane 2—2 of Figure 1;

Figure 3 is a sectional view, with parts shown in elevation, taken along the plane 3—3 of Figure 2;

Figure 4 is a sectional view taken along the plane 4—4 of Figure 3;

Figure 5 is a sectional view similar to Figure 2 illustrating the ejector in an operated position from its position of Figure 2 and tracing the path of movement of the ejector teeth.

As shown on the drawings:

In Figure 1 reference numeral 10 refers generally to a fertilizer distributor of the present invention. The distributor 10 comprises a hopper 11 having an arcuate bottom 12 provided with a series of longitudinally aligned, generally triangular apertures 13 spaced along the length thereof. The hopper 11 is supported in spaced relation to the ground by a pair of wheels 14 at either end of the hopper and disposed upon a rotatable shaft 15 extending longitudinally through the hopper for rotation therein upon rotation of the wheels 14 by virtue of their engagement with the ground. The undersurface of the hopper bottom 12 carries a plurality of laterally aligned longitudinally spaced slide brackets 16 which slidably journal a longitudinally movable shutter plate 17 bearing a plurality of generally triangular apertures 18 preferably identical with the apertures 13 in the hopper bottom 12. The longitudinally movable slide plate 17 is adapted to be actuated by means well-known in the art and including a lever 19 pivotally attached to an actuating rod 20 which in turn is pivoted to a crank lever 21 pivoted to the distributor tongue 22 and adapted to be actuated by means of a hand lever 23. Upon longitudinal sliding movement of the plate 17, the apertures 13 and 18 are brought into more or less registry. Since the fertilizer must be dispensed through both the hopper bottom 12 and the plate 17, the size of the orifices, through which the fertilizer is dispensed is governed by the degree of registry of the apertures, as is well-known in the art.

Upon the shaft 15 and within the hopper 11 there are disposed a plurality of longitudinally spaced actuating cams 25, the cams having an exterior periphery eccentric with respect to their axis of rotation, which axis of rotation coincides with the axis of the shaft 15. The peripheral camming surfaces of the cams 25, are chamfered so that the cams are each provided with a pair of sloping, oppositely directed camming surfaces 26.

The cams are surrounded by forcing arm plates 27 having centrally located inclined surfaces 28 which closely mate with the chamfered cam faces 26. The arm plates 27 cooperate to define a forcing arm indicated generally at 29, the plates being held together by suitable means, as by rivets 30, so as to accommodate assembly of the arm 29 upon the cams 25. The arms include a depending plunger portion 31 terminating in serrated teeth 32, the plunger portion 31 being positioned directly over the base side of the triangular dispensing aperture 13 formed in the hopper bottom 12. The forcing arms 29 each terminate in an upwardly extending guide portion 33 which is laterally offset, as at 34, from the remainder of the arm for a purpose to be hereinafter more fully described. The free upper extremity of the guide portion 33 is entered within a slot 35 formed in a guide plate 36 extending transversely across the width of the hopper and secured by suitable means, as by rivets 37, to the inner surfaces of the hopper intermediate the depth thereof.

Also disposed upon the shaft 15 and in closely spaced relation to each forcing arm 29, there is disposed an agitating spider 38 having triangularly arranged, radially extending agitator arms 39 terminating in laterally extending lips 40. From Figures 2, 3, and 4, it will be noticed that a pair of the lips 40 project laterally away from the associated forcing arm 29, while the third lip 40 projects toward the arm. Since the agitating spiders 38 are secured to the shaft 15, rotation of the shaft will cause consequent rotation of the spiders, and the inturned lip 40 will pass beneath the plunger portion 31 of the associated arm 29, with clearance between the lip 40 and the arm guiding portion 33 being accommodated by the offset section 34.

Due to the provision of the cam 25, it will be appreciated that rotation of the shaft 15 will effect eccentric movement of the arm 29 relative to the shaft. The arm is held against rotation with the shaft by the provision of the guiding portion 33 of the arm abutting against the side portions of the slots 35. Since the cam throw is eccentric with respect to the shaft, the teeth 32 at the lower extremity of each of the arms 29 will each move in an elliptical path, these paths of movement being indicated in dotted outline at 41 in Figure 5. It will be noted that the path of elliptical movement of the teeth is such that the teeth actually enter into and move through the triangular apertures 13, the path of movement of the teeth being transverse with respect to the hopper and parallel to the base leg of the triangular apertures. The path of movement of the teeth is thus along the major dimension of the triangular apertures, so that entry of the teeth into the apertures is accommodated and the teeth effectively wipe the entire extent of the aperture along one edge thereof. The portion of the aperture wiped by the teeth is always in communication with the registering portion of the corresponding aperture 18 and the plate 17, since initial registry of the apertures brings the apex of the corresponding aperture 18 into registry with the central portion of the base leg of the aperture 13 thereabove.

The elliptical path followed by the teeth results in a combined wiping and forcing movement of the forcing arm, since the teeth path of travel has a component radially directed with respect to the shaft so as to cause the teeth to enter the registering apertures, as well as a second component extending longitudinally along the base leg of the aperture.

Since both the cam and the spider 38 are secured to the shaft 12 for corotation, the movement of the spider and the forcing arm may be readily correlated. This correlation is such that the inturned lip 40 of the spider is interposed between the teeth 32 of the associated forcing arm and the corresponding aperture 13 as the camming action is withdrawing the teeth from the aperture. In this manner, any lumps interposed between the teeth and the aperture are removed and there is no possibility of interference of the cam arm with the lip 40.

Of course it will be appreciated that a plurality of sets of forcing arms 29 and agitating spiders 38 will be provided in spaced relation along the length of the shaft 15, and that the elements of only a single unit of the combination have been shown in the drawings in order to simplify the disclosure.

From the foregoing description, those skilled in the art will readily understand that the present invention provides a novel and effective means for dispensing fertilizer through a series of aligned and registering apertures. The rate of dispensing of fertilizer is determined by the degree of registry of the apertures in the hopper bottom and in the slide plate. The forcing of fertilizer through the aperture is effected by the employment of a forcing arm having a terminal portion enterable into the fixed apertures formed in the hopper bottom. The forcing of the fertilizer through the apertures is in no way effected by the degree of registry of the apertures and is independent of the rate of fertilizer flow. The agitating spiders are operable in timed relation with respect to actuation of the forcing arms to clear the dispensing aperture of any lumps or other material which might possibly interfere with the dispensing of fertilizer. The elliptical path followed by the forcing arm teeth aids in forcing fertilizer through the aperture, wiping material across the aperture, and in accommodating the entry of the spider lip between the forcing arm and the aperture.

It will, of course, be understood that many details of construction may be varied through a wide range without departing from the principles of this invention and it is, therefore, not the purpose to limit the patent granted hereon otherwise than necessitated by the scope of the appended claims.

I claim:
1. In a fertilizer distributor, a hopper having a longitudinally extending series of triangular apertures in the bottom thereof, the base leg of said apertures extending transversely of the length of said hopper, a longitudinally slidable shutter plate underlying said hopper and having a plurality of triangular apertures therein selectively alignable with the apertures of said hopper to provide dispensing orifices, a rotatable shaft in said hopper, means for rotating said shaft, separate cam means rotatable with said shaft and having peripheral camming surfaces eccentric with respect to the axis of rotation of said shaft and aligned with the base legs of said apertures, agitating spiders interposed between said cam means and each having radially extending legs rotatable with said shaft within said hopper, said legs having terminal lips traveling in peripheral paths and at least one of said lips being interposed between said shaft and the adjacent hopper aperture, and a plurality of forcing arms depending from said shaft toward the hopper apertures and contacting the peripheral surfaces of said cam means for actuation towards and away from the hopper bottom upon rotation of said shaft, the terminal free ends of said arms traveling in elliptical paths parallel to the base legs of said hopper apertures and entering said hopper apertures at one radial extremity of the arm movement, said arm terminal ends being elevated from the hopper bottom at the other radial extremity of said path to accommodate passage of said at least one spider leg lip between said arm free end and said hopper aperture.

2. In a fertilizer distributor, a hopper having a polygonal discharge port therein with a port straight edge lying transversely of said hopper, shutter means movable relative to said hopper and having a polygonal aperture therein, one apex of which is registerable in varying degrees with said port adjacent to the port straight-edge to thereby vary the effective area of said port, a shaft overlying said port, means for rotating said shaft, a cam mounted on said shaft and rotatable therewith, said cam having a peripheral cam surface eccentric with respect to said shaft, and an ejector arm having a bearing surface encircling said cam surface, and a dependent portion projecting toward said port, said dependent portion of said arm terminating in ejector teeth movable in an elliptical path generally parallel to said port straight edge, with said teeth being enterable into said port and movable therethrough to forceably eject fertilizer through said port and to wipe the same clear of fertilizer.

3. In a fertilizer distributor, a hopper having a discharge port therein, shutter means movable relative to said hopper and having an aperture therein, registerable in varying degrees with said port to thereby vary the effective area of said port, a shaft overlying said port, means for rotating said shaft, an agitating spider rotatable with said shaft and having a radial finger terminating in a lip lying in a plane parallel to the shaft axis and movable in a peripheral path concentric with said shaft axis, a cam mounted closely adjacent said spider on said shaft and rotatable therewith, said cam having a peripheral cam surface eccentric with respect to said shaft, an ejector arm having a bearing surface encircling said cam surface. and a dependent portion projecting toward said port, said dependent portion of said arm terminating in ejector teeth movable in an elliptical path including movement transverse to said hopper and movement radial to said shaft with said teeth during transverse movement being enterable into said port, and movable therethrough to forceably eject fertilizer therethrough and to wipe the port clear of fertilizer, and said teeth being withdrawn from said port during radial movement thereof to accommodate passage of said spider lip between said teeth and said port.

References Cited in the file of this patent

UNITED STATES PATENTS

| 201,715   | Swan    | Mar. 26, 1878 |
| 731,243   | Swilling | June 16, 1903 |
| 1,330,422 | Bausman | Feb. 10, 1920 |
| 2,180,989 | Lohn    | Nov. 21, 1939 |
| 2,510,231 | Juzwiak | June 6, 1950  |